Sept. 22, 1959  A. GOETZ  2,904,857

BACTERIOLOGICAL FILTER UNIT

Filed Jan. 15, 1957

INVENTOR.
ALEXANDER GOETZ
BY Lyon & Lyon
ATTORNEYS

United States Patent Office 2,904,857
Patented Sept. 22, 1959

2,904,857

BACTERIOLOGICAL FILTER UNIT

Alexander Goetz, Altadena, Calif.

Application January 15, 1957, Serial No. 634,380

3 Claims. (Cl. 21—82)

My invention relates to baceteriological filter units, and more particularly to filter units wherein a predetermined quantity of liquid or air is drawn through a filter membrane which is then removed and the collected bacteria or other microorganisms are incubated, and is a continuation-in-part of my copending application filed May 21, 1953, Serial No. 356,483, for "Baceteriological Filter Unit and Method of Sterilizing," now abandoned.

Included in the objects of my invention are:

First, to provide a bacteriological filter unit which is compact and is intended and adapted for use in a laboratory as well as use with portable field equipment.

Second, to provide a bacteriological filter unit which is so arranged that all parts which come in contact with the liquid to be filtered may be readily and effectively sterilized, either in the laboratory or in the field, with virtually no extraneous equipment, the filter unit itself serving as the sterilizing chamber.

Third, to provide a bacteriological filter unit which is particularly simple to use and to sterilize so that untrained personnel may collect bacteriological specimens without contamination, and which may be depended upon for purposes of bacteriological surveys or investigations.

With the above and other objects in view appearing hereinafter, reference is directed to the accompanying drawings in which.

Figure 1:
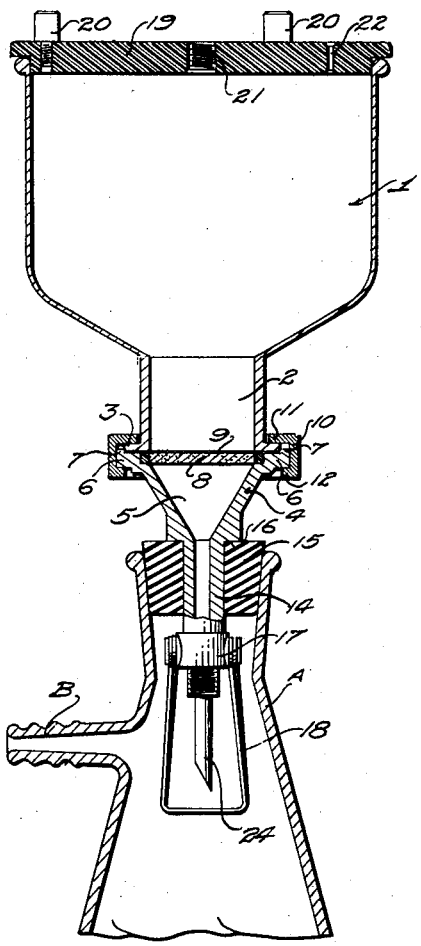
Figure 1 is a longitudinal sectional view of the bacteriological filter unit shown in position for collecting bacteriological specimens.

My bacteriological filter unit includes a combined measuring and sterilizing chamber 1 in the form of a cylinder, the lower end of which tapers and forms a hollow discharge stem 2. The extremity of the stem is provided with an external flange 3 which is adapted to abut the upper enlarged end of a filter support assembly 4.

The upper end of the filter support assembly is in the form of a conical funnel designated 5 which terminates in a flange 6 having a rudimentary rim 7. The flange 3 of the chamber 1 fits within the rim 7.

Fitted within the upper end of the conical portion 5 is a filter backing disk 8 formed of porous metal or ceramic material, and having a surface flush with the flange 6. A filter membrane 9 in the form of a flat porous disk is interposed between the confronting flanges 3 and 6.

A clamp ring 10 fits loosely around the stem 2 and is provided with an internal flange 11 which bears axially against the flange 3. The clamp ring is provided with radially inwardly directed lugs 12 which may be adapted to coact with helical cam elements 13 formed around the periphery of the flange 6. The clamp ring serves to draw the flanges 3 and 6 together and securely clamp the margins of the filter membrane 9.

It should be observed that the filter membrane is a special filter element developed for collecting bacteriological samples. The pore space in the membrane is sufficiently small so that microorganisms are collected on its upper surface, although water or other liquid may pass freely through the membrane.

A stem 14 extends downwardly from the conical portion 5 and receives a stopper 15. The stopper may be limited in axial movement by a shoulder 16 at the juncture of the stem 14 and conical portion 5.

Beyond the stopper 15 the stem 14 receives a collar 17 having a pair of diametrically disposed trunnions for journalling a pair of U-shaped frames 18 adapted to be spread apart and form supporting feet for the filter support assembly 4; that is, the members 18 serve, when desired, to retain the filter support in an upright position.

The measuring and sterilizing chamber 1 is adapted to receive a cover 19. The cover may be provided with knobs 20 so as to serve as a support for the cover and sterilizing chamber when these members are inverted. Centered in the cover 19 is a screw-threaded aperture 21. Also provided in the cover is a small vent opening 22.

With reference again to the stem 14, the stem is provided with a screw-threaded section 23 which is adapted to fit into the aperture 21 so that the entire filter support assembly 4 may be suspended from the cover 19 in an inverted position within the chamber 1. Beyond the screw-threaded section 23 the stem 14 is provided with a discharge tip or quill 24.

A sterilizer base 25 is provided which is in the form of a flat plate supported by feet 26. The base is provided with an annular wall which receives the flange 3 and clamp ring 10.

Centered in the sterilizer base 25 is a depression 28 adapted to receive a wick 29 containing an inflammable sterilizing substance. Surrounding the depression 28 there may be provided one or more ports 30.

Operation of my bacteriological filter unit is as follows:

When assembled ready for use the parts of the filter unit are arranged as shown in Figure 1. The stopper 15 may be fitted in the upper end of an Erlenmeyer flask A which is provided with a side outlet B for connection to any source of vacuum pressure. It is, of course, recognized that any suitably apertured means for receiving the stopper 15 and arranged for communication to a source of vacuum pressure may be used.

Prior to or after mounting the filter support assembly 4, the filter membrane 9 is interposed between the flanges 3 and 6 and the clamp ring tightened.

A predetermined quantity of water or other fluid, the bacteriological content of which is to be assayed, is poured into the container 1 and allowed to be drawn through the filter membrane 9. Alternatively, air or other gaseous medium may be drawn through the filter membrane. In either case, after the bacteriological sample has been collected on the membrane the clamp ring is loosened, the flanges are separated, and the membrane is removed for placement in a Petri dish or otherwise utilized for the purposes of a bacteriological survey.

Figure 2:
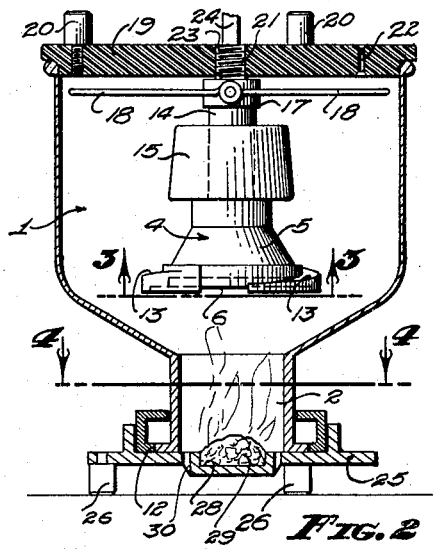
Figure 2 is a similar sectional view thereof, showing my filter unit arranged to permit sterilization.
Figure 3:
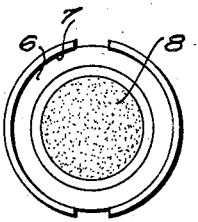
Figure 3 is an end view of the filter support assembly taken along the line 3—3 of Figure 2.
Figure 4:
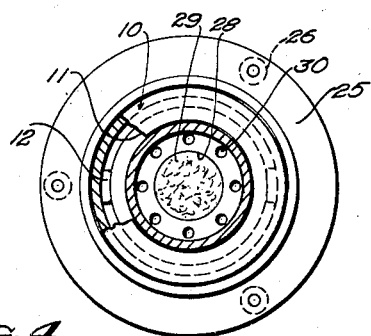
Figure 4 is a transverse sectional view taken along the line 4—4 of Figure 2.

In order to prepare the equipment for further use, the filter support assembly is inverted and screw-threaded into the cover 19 so as to be suspended in the chamber, as shown in Figure 2. A predetermined quantity of sterilizing material is placed in the depression 28 and ignited, or caused to fume. The chamber is then set over the burning or fuming sterilizing material. The resultant volatile sterilizing material permeates the chamber for sterilizing the inner surfaces thereof as well as the filter support assembly 2.

After sterilization the chamber and filter support assembly are reassembled with another filter membrane between the flanges 3 and 6.

My filter unit is uniquely suited to a particular sterilizing method. This consists in burning a predetermined quantity of methyl alcohol in the depression 28. The size of the ports 30 and 22 are such that the methyl alcohol undergoes incomplete combustion so as to produce formaldehyde along with carbon dioxide, water, and formic acid ($2CH_3OH + O_2 2HCOH + 2H_2O$). The formaldehyde sterilizes all exposed parts of the filter equipment and funnel.

As is well known, formaldehyde is a most active bactericide, and is extremely volatile. This is important for the purposes of my method, in that it is essential that all of the sterilizing agents evaporate and leave no residue which would interfere with the development of the bacteria collected.

To sterilize the apparatus a few milliliters of methyl alcohol are poured onto the wick which is then lighted with a match. The funnel is put in position and the flame is allowed to burn for approximately ten seconds. During this time, the air volume in the funnel is heated so that a draft of fresh air is created through the ports 30. Then the plate 19 with the suspended filter unit is slowly set in place as shown in Figure 2. No further attention is necessary as, for a few seconds more, the flame burns assisted by the ports 22 in the plate 19, but as the draft diminishes, the combustion becomes less complete and produces, instead of carbon dioxide and water, to an increasing extent, formaldehyde with traces of formic acid and water. The flame is extinguished when no more additional oxygen is available—that is, when no more oxygen can be brought in from the outside. The assembly is allowed to remain in this position until used.

The performance of the sterilizing equipment was tested by filling the assembled apparatus, as shown in Figure 1, with 400 ml. of water containing an artificial bacterial contamination of approximately $10^5$ per ml. *Esch. coli*, $10^4$ per ml. *B. subtilis* (*globigii*, spores), and $10^5$ per ml. *Staph. aureus*. After the liquid has passed through the equipment—funnel, carbon screen, and base—the unit was disassembled and sterilized in the position shown in Figure 2. After an elapsed time varying between 10 and 30 min., the unit was reassembled for filtration, a molecular filter membrane was inserted, and 50 to 100 ml. of sterile water were filtered through the membrane after first wetting the interior with the sterile water. Subsequently, the membranes were cultured. The control experiment followed the same procedure without performing the sterilizing procedure.

It is obvious that if a drop of the contaminated fluid remains after the first filtration, it affects the time required for the sterilization process. If these drops are removed before sterilizing by wiping with a paper towel or by rinsing with tap water, the reduction of the remaining contaminants is more rapid as the following data shows:

After 10 min. exposure, the wiped equipment showed four colonies which were reduced to one after 15 min., and none after 30 min. The nonwiped equipment showed fifteen colonies after 20 min. and none after 30 min. The controls showed, in the wiped equipment, 1 to $2 \times 10^3$ and in the nonwiped, 2 to $3 \times 10^3$ colonies.

In order to test for an inhibitory residue, a membrane was inserted immediately after the sterilization procedure and through it was filtered a *Staph. aureus* suspension of known concentration. The results were compared with an analogous passage through a unit which had not been exposed previously to formaldehyde. The concentration on the membrane was of the order of $10^3$ to $10^4$ organisms.

No difference between the two samples could be demonstrated and it can therefore be assumed that an inhibitory residue is absent.

For most purposes, an exposure to the sterilizing procedure of 15 to 30 min., even in the presence of heavy (spore-containing) contaminants, appears sufficient, especially if either rinsing or wiping is used to remove the liquid residues of the preceding filtration.

Having fully described my invention, it is to be understood that I do not wish to be limited to the details herein set forth, but my invention is of the full scope of the appended claims.

What is claimed is:

1. A bacteriological filter and sterilization unit, comprising: a container having a discharge end of reduced diameter; a cover for said container; a filter support having a discharge duct; means for removably attaching said support to the discharge end of said container; other means for suspending said support in said container from said cover; and a sterilizer base adapted to receive the discharge end of said container; said sterilizer base having a compartment therein to receive an ignitable substance which by partial oxidation forms a gaseous sterilizing oxidation product, said base and cover having openings therein to control the rate of combustion of said substance whereby on igniting such substance the interior of said container and said filter support are sterilized by the resulting gaseous sterilizing oxidation product.

2. A bacteriological filter and sterilization unit, comprising: a container having a discharge end of reduced diameter; a cover for said container; a filter support including a flared end adapted to abut the discharge end of said container, a discharge duct, and a porous filter supporting disk carried by said flared end; means for securing said flared end to the discharge end of said container and clamping a filter element therebetween; said cover being adapted to receive said discharge duct to suspend said filter support in an inverted position in said container; and a sterilizer base adapted to receive the discharge end of said container; said sterilizer base having a compartment therein to receive an ignitable substance which by partial oxidation forms a gaseous sterilizing oxidation product, said base and cover having openings therein to control the rate of combustion of said substance whereby on igniting said substance the interior of said container and all portions of said filter support subject to contamination are sterilized by the resulting gaseous sterilizing oxidation product.

3. A bacteriological filter and sterilization unit according to claim 2 wherein said cover and said sterilizer base effectively shield the interior of said container and said filter support against contamination when said filter support is positioned in the inverted position.

References Cited in the file of this patent

UNITED STATES PATENTS

| | | |
|---|---|---|
| 202,268 | Keller | Apr. 9, 1878 |
| 559,905 | Pike | May 12, 1896 |
| 636,489 | Clarke | Nov. 7, 1899 |
| 659,494 | Smith | Oct. 9, 1900 |
| 664,290 | Reeves | Dec. 18, 1900 |
| 715,335 | Alphin | Dec. 9, 1902 |
| 813,363 | Dietrich | Feb. 20, 1906 |
| 1,120,229 | Nieman | Dec. 8, 1914 |
| 1,524,419 | Berry | Jan. 27, 1925 |
| 2,379,101 | Post | June 26, 1945 |

FOREIGN PATENTS

| | | |
|---|---|---|
| 1,844 | Great Britain | Apr. 28, 1881 |